(12) United States Patent
Sanders (10) Patent No.: US 6,820,796 B2
(45) Date of Patent: Nov. 23, 2004

(54) DIFFUSION BONDED MULTISHEET SPF STRUCTURE

(75) Inventor: Daniel G. Sanders, Sumner, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/199,759

(22) Filed: Jul. 17, 2002

(65) Prior Publication Data

US 2002/0179688 A1 Dec. 5, 2002

Related U.S. Application Data

(60) Continuation of application No. 09/590,865, filed on Jun. 9, 2000, now abandoned, which is a continuation of application No. 09/057,149, filed on Apr. 7, 1998, now abandoned, which is a division of application No. 08/721,402, filed on Sep. 26, 1996, now Pat. No. 6,129,261.

(51) Int. Cl.[7] ............................................. B23K 28/00
(52) U.S. Cl. ...................................... 228/157; 228/193
(58) Field of Search ................................ 228/193, 194, 228/195, 157, 190, 155, 118, 214

(56) References Cited

U.S. PATENT DOCUMENTS

| 2,882,588 | A |   | 4/1959  | Rieppel et al. |
|-----------|---|---|---------|----------------|
| 3,927,817 | A |   | 12/1975 | Hamilton et al. |
| 4,087,037 | A |   | 5/1978  | Schier et al. |
| 4,217,397 | A |   | 8/1980  | Hayase et al. |
| 4,304,821 | A |   | 12/1981 | Hayase et al. |
| 4,393,987 | A |   | 7/1983  | Anderson et al. |
| 4,632,296 | A |   | 12/1986 | Mansbridge et al. |
| 4,811,890 | A |   | 3/1989  | Dowling et al. |
| 4,882,823 | A |   | 11/1989 | Weisert et al. |
| 4,916,027 | A | * | 4/1990  | DelMundo ................... 428/586 |
| 4,934,580 | A |   | 6/1990  | Sutton |
| 4,956,008 | A |   | 9/1990  | McQuilkin |
| 5,115,963 | A |   | 5/1992  | Yasui |
| 5,139,887 | A |   | 8/1992  | Sutton |
| 5,193,737 | A |   | 3/1993  | Carraher |
| 5,226,578 | A |   | 7/1993  | Douglas |
| 5,232,525 | A |   | 8/1993  | Smith et al. |
| 5,289,965 | A |   | 3/1994  | Yasui et al. |
| 5,344,063 | A |   | 9/1994  | Johnston et al. |
| 5,420,400 | A | * | 5/1995  | Matsen ....................... 219/615 |
| 5,435,226 | A | * | 7/1995  | McQuilkin ................. 89/36.02 |
| 5,467,626 | A |   | 11/1995 | Sanders |
| 5,636,440 | A |   | 6/1997  | Bichon et al. |
| 5,692,881 | A |   | 12/1997 | Leibfried |
| 5,729,901 | A |   | 3/1998  | Fowler et al. |
| 5,821,506 | A | * | 10/1998 | Matsen ....................... 219/615 |
| 6,087,640 | A | * | 7/2000  | Gillespie et al. ............ 219/615 |
| 6,129,261 | A | * | 10/2000 | Sanders |
| 2002/0179688 | A1 | * | 12/2002 | Sanders |

OTHER PUBLICATIONS

C. F. Barth, "Advances in Aircraft Component Superplastic Forming/Diffusion Bonding Technology," SAE Technical Paper Series, 912216, 1991.

* cited by examiner

*Primary Examiner*—Kiley Stoner
(74) *Attorney, Agent, or Firm*—John C. Hammar (57) ABSTRACT

A multisheet structure is made using compression diffusion bonding according to the present invention using a CRES template to apply increased pressure in the areas designated for diffusion bonds (DB) to improve the bond quality and to reduce the processing time. The CRES template is patterned to correspond with the DB arrangement in the superplastically formed part. The forming press forces the template against the pack of SPF sheets to provide 300–1200 psi or more pressure along the bond lines to speed their formation.

2 Claims, 5 Drawing Sheets

DIFFUSION BONDED MULTISHEET SPF STRUCTURE

REFERENCE TO RELATED APPLICATIONS

The present application is a continuation application based upon U.S. patent application Ser. No. 09/590,865, filed Jun. 9, 2000, now abandoned, which is a continuation based upon U.S. patent application Ser. No. 09/057,149, filed Apr. 7, 1998, now abandoned, which is a divisional application based upon U.S. patent application Ser. No. 08/721,402, filed Sep. 26, 1996, now U.S. Pat. No. 6,129,261.

TECHNICAL FIELD

The present invention relates to a method for diffusion bonding metals, particularly to compression diffusion bonding of superplastic alloys in superplastic forming (SPF) operations.

BACKGROUND OF THE INVENTION

The superplastic forming (SPF) and diffusion bonding (DB) process is well documented and has been in use in the aerospace industry for many years. Many kinds of SPF/DB panels are made using a variety of numbers, sizes or thickness of sheets; welding techniques; bonding techniques; stopoff configurations; or other variables. The present invention relates to an improvement in compression diffusion bonding to manufacture integrally stiffened SPF/DB parts. Conventional compression diffusion bonding uses the force reacted between opposed die surfaces of the forming press at elevated temperature to achieve intimate contact and pressure between two or more mating sheets of metal, especially titanium or its SPF alloys. Conventional SPF/DB processes are described, for example, in U.S. Pat. Nos. 5,141,146; 5,115,963; 5,055,143; 4,304,821; 3,924,793; 3,927,817; 4,530,197; 5,330,093; 4,882,823; and 4,292,375, which I incorporate by reference.

Currently compression diffusion bonding requires expensive metal dies, which also require lead flow times to fabricate. The SPF/DB process, for example, for Ti-6Al-4V alloy requires temperatures of about 1650–1750° F. with 300 psi differential gas pressure applied using weld-quality argon gas for 3 hours or more under continuous gas purge with intimate contact between clean, debris-free surfaces that have a fine stable grain size.

The state-of-the-art method for compression diffusion bonding uses precision machined, matching, Corrosion Resistant Steel (CRES) plates or dies having an interfacial grid pattern. The SPF titanium material is sandwiched between the dies and is compressed locally at the grid to create a diffusion bond. Forming the dies with the grid pattern is a slow and expensive process because of the limitations on machining that CRES alloys impose. This conventional method is too expensive to justify its use for prototyping, low rate production, or limited quantity production, because making the dies is out of the question. Therefore, designers have avoided SPF/DB designs because they have not been able to verify their integrity at reasonable costs.

Even when implemented, the conventional CRES process is also plagued by the rapid distortion of the die surfaces because of the extended exposure to both high temperatures (1600–1750° F.) and large loads required to accomplish diffusion bonding. The opposed surfaces die creep out of shape. Once the die surfaces no longer mate together closely, the compressive forces between the titanium sheets are lost and diffusion bonding no longer occurs. This deterioration of the dies is a particular nuisance because localized disbonding will cause rupturing of the core pack during its intended use, especially in aerospace applications where the part will be subjected to close to its design limits in an effort to reduce overall vehicle weight. In the complete parts the diffusion bonds are often sealed within the part and cannot be inspected. Disbonding poses a potentially catastrophic failure, and inspection is difficult if not impossible. Designers shy away from relying on SPF/DB designs where bond integrity cannot be assured.

While the inability to assure quality diffusion bonds has severely limited the adoption of SPF/DB parts in aerospace applications, making the parts by alternate processes, however, is expensive. Alternatives usually require complicated machining of individual detail parts and their assembly into the completed subassembly. Considerable labor and inspection is required and part variability produces variation in the final subassembly. Fasteners at significant assembly cost. Modern aerospace manufacturing needs the cost savings associated with SPF/DB manufacture, provided that the integrity of the diffusion bonds can be guaranteed.

Another problem designers face with conventional diffusion bonding processes is that there is not a simple way to laser weld or resistance weld complex shapes of core configurations into the inner core sheets of SPF/DB panels. With resistance welding, the designer is limited primarily to straight lines of welded cores. In some instances, gentle arcs can make an extremely competent welder, but the parts are subject to high rejection rates. The laser welding process is better in this regard, but the welding heat distortion caused by the laser can cause severe bending and bowing of the mating sheets leaving areas where intimate contact between the sheets is lost.

The industry needs a reliable compression DB method that enables the rapid fabrication of SPF/DB panels using inexpensive tooling. It also needs a method that eliminates the problems of localized disbanding by assuring intimate contact between sheets throughout the DB cycle. The inexpensive fabrication tools of the present invention allow the construction of numerous sets of tools at only a fraction of the cost of conventional SPF/DB tools. Therefore, a supply of compression DB backup tools can be fabricated and kept in reserve in case those in use are damaged or become distorted. Reserve tools facilitate production runs and guarantee timely delivery. SPF/DB manufacture promises reduced total part count and reduced airplane cost.

Companies that have tried to use the conventional compression DB method to produce DB parts have had difficulties in keeping the die surfaces closely matched. In the case of F-15E parts, the eventual deterioration and distortion of its SPF/DB dies led McDonnell Douglas to try tack welded shims in the areas where disbanding was occurring. The shims increased the stack up thickness of material, thereby theoretically applying more force in those areas where the die had been bent. Unfortunately, the shims simply aggravated the bending of the die, caused even greater misalignment and distortion, and produced an even greater number of disbonds on the parts.

As previously mentioned, a primary problem with using patterned CRES dies are their expense. The dies are typically custom cast close to their net shape from CRES material, such as ESCO 49C, IN100, HN, or 22-4-9 CRES. The die surfaces are then precision ground and machined to obtain a close match, especially where the part will have compression diffusion bonds. The dies are 6–24 inches thick and generally 2 ft×2 ft to 6 ft×12 ft. CRES alloys are expensive and their machining is timeconsuming. A 3 ft×2 ft CRES die can take up to nine months to construct. The die design must be numerically defined to permit NC machining of the surfaces. Casting can take up to 16 weeks. Machining, handworking, inspecting, and assembly can, then, take another 20 weeks. If rework of the die is needed (welding and machining), the lead time and expense becomes extraordinary. Even a small die design change can take months to accomplish because of the necessary reworking of the dies.

Accordingly, the current method to fabricate compression DB parts for both experimental and production applications is inadequate.

BRIEF SUMMARY OF THE INVENTION

To achieve compression DB of titanium sheets, a tooling setup squeezes the sheets together in the areas where diffusion bonds are needed. The tooling required for bonding two sheets of titanium consists, in a preferred embodiment illustrative of the invention, of two thick blocks of stainless steel and one laser cut sheet (i.e. a template) of approximately 0.150 inch thick CRES stainless steel (304). The CRES sheet is laser cut with the desired grid pattern corresponding to the location of the bonds in the product. The two sheets of titanium (the production part sheetstock) are cleaned, welded together around their periphery to form a pack, and configured to have gas tubes fusion welded to allow argon gas to enter the pack. The pack is then sandwiched between the stainless steel plates and CRES template between the platens of the SPF press. The entire stack-up is heated. Compression force is applied using the hydraulic ram of the press. Diffusion bonds form in a grid pattern corresponding to the pattern of the CRES template. Gas pressure inflates the pack during the bonding cycle to avoid bonding of areas within the pack where bonding is not desired and keeps them from touching. The template allows significantly higher pressures to be applied to the bond line which reduces the time required for bonding and improves the quality of the bond. Parts built using a single CRES template differ from those that are made using two templates. A single CRES template provides parts having one flat surface and one surface that is formed. Parts made using two CRES templates (one on either side of the pack) will have two pillowed surfaces on the top and the bottom of the part.

The method produces cores for multisheet, complicated DB parts, and is especially designed for the fabrication of cores for 4-sheet DB packs.

Two sheet packs can be compression diffusion bonded in one hour or less. Therefore, this process may be more economical than the methods for making resistance or laser welded cores that are generally in use today. The method of the present invention avoids the 3 hour bonding cycle that is used by the conventional DB method, because of the higher compression forces.

The CRES template can be cut at virtually any draft angle, which allows the part to be diffusion bonded into a grid shape of almost any height and angle. A complicated part can be compression diffusion bonded and formed to the needed shape in one cycle.

DETAILED DESCRIPTION OF THE INVENTION

The most versatile, conventional method for producing 2-sheet SPF/DB parts and the cores for 4 or more sheet SPF/DB parts has been the stopoff technique, whereby a boron nitride or an yttria mixture is applied using silkscreening to the areas of the pack where bonding is unwanted. The stopoff pattern can be flexible to allow many different shapes of "dot core," "truss core," and other configurations of multi-sheet SPF/DB. In the stopoff method, however, the silkscreening process is difficult to control. Process repeatability is a major issue. The method of the present invention is useful to make any of these prior art configurations.

The resistance welding method of the prior art is not as flexible as the stopoff method for producing cores. For resistance welding, a straight line weld or only a slightly curved weld line can be produced—thereby limiting the designer in terms of the complexity of the design. "Dot core", for example, cannot be made using the resistance welding approach. Laser welding is also limited when compared to the stopoff method, since the process creates distortion of the material due to the high melting/welding temperatures.

The compression diffusion bonding system of the present invention is substantially as flexible as the stopoff method in terms of the complexity of SPF/DB panel that it can produce. Virtually any core geometry can be cut into the CRES templates. Circular bonds will be used for "dot core." Linear bonds with skips will be used for 2-sheet compression bonded/formed "stiffened panels." Many other variations are possible.

Figure 1:
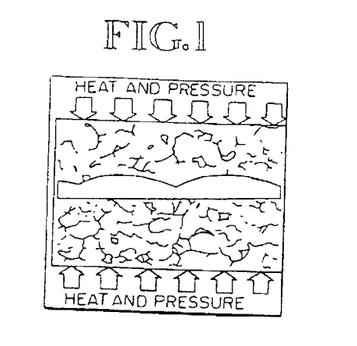
FIG. 1 is a magnified sectional view of a typical interface between two sheets prior to compression diffusion bonding.
Figure 2:
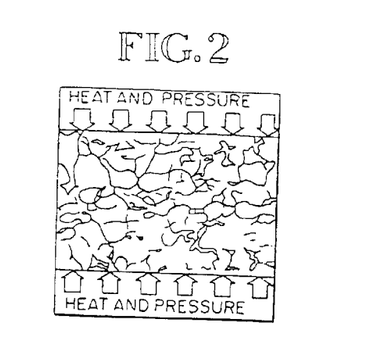
FIG. 2 is another magnified sectional view, similar to FIG. 1, of the interface of two successfully diffusion bonded sheets.
Figures 3, 4:
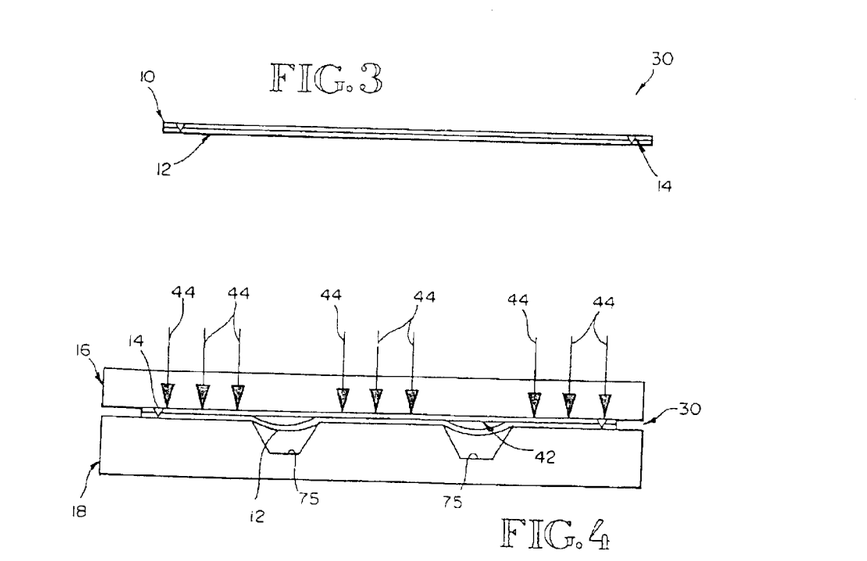
FIG. 3 is a schematic sectional view of a two sheet pack prepared for diffusion bonding.
FIG. 4 is a sectional view showing the pack of FIG. 3 in an SPF process during conventional compression diffusion bonding.

As shown in FIG. 3, a two-sheet pack 30 includes an upper sheet 10, such as Ti-6Al-4V alloy, a lower sheet 12 of the same material, and an edge weld 14 (or equivalent, fluid-tight seal) to create a cavity between the sheets.

Figure 5:
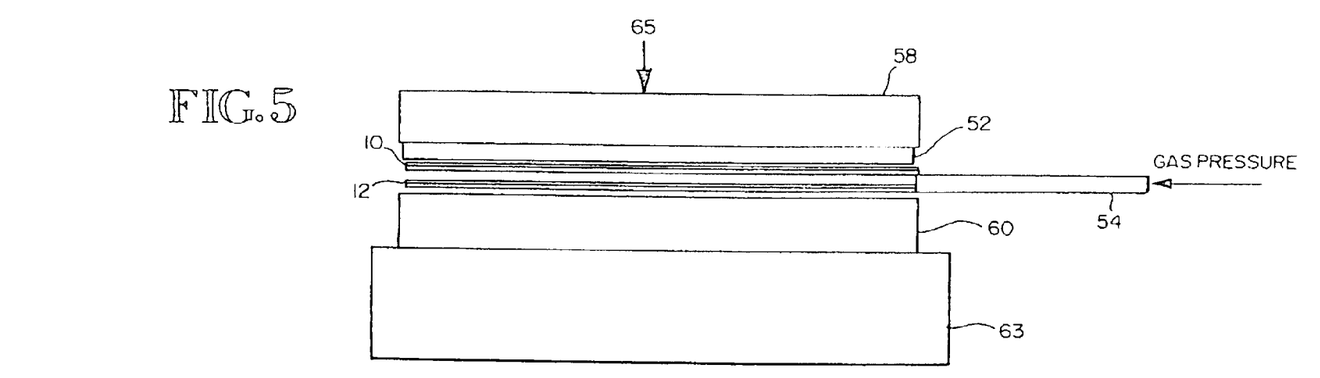
FIG. 5 is a sectional view of a compression diffusion bonding stack up of the present invention.
Figure 6:
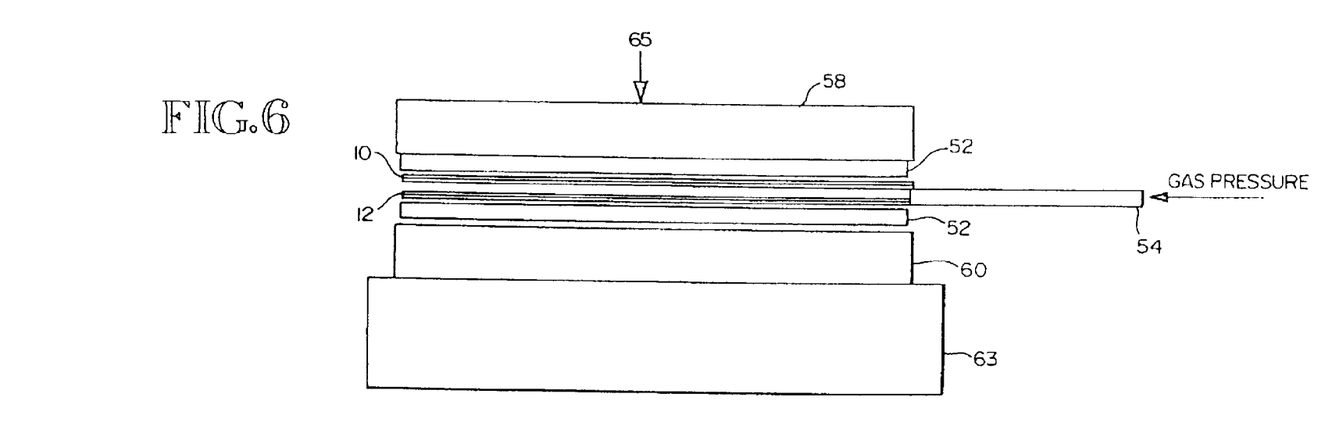
FIG. 6 is another sectional view showing an alternate stack up using two CRES templates.

The pack 30 is positioned between opposing die surfaces 16 and 18 in a superplastic forming press. The die surfaces are pressed together and the pack is heated to the superplastic forming range of he sheets. Forming gas is introduced to the cavity or cavities 42 between the sheets through a suitable forming gas inlets (54, FIG. 5) to form the pack into the complementary die configuration of the finished part here a fully formed hat section, while diffusion bonds 44 are formed in the areas where the sheets 10 and 12 are in intimate contact between the precision machined surfaces of the die.

Figure 7:
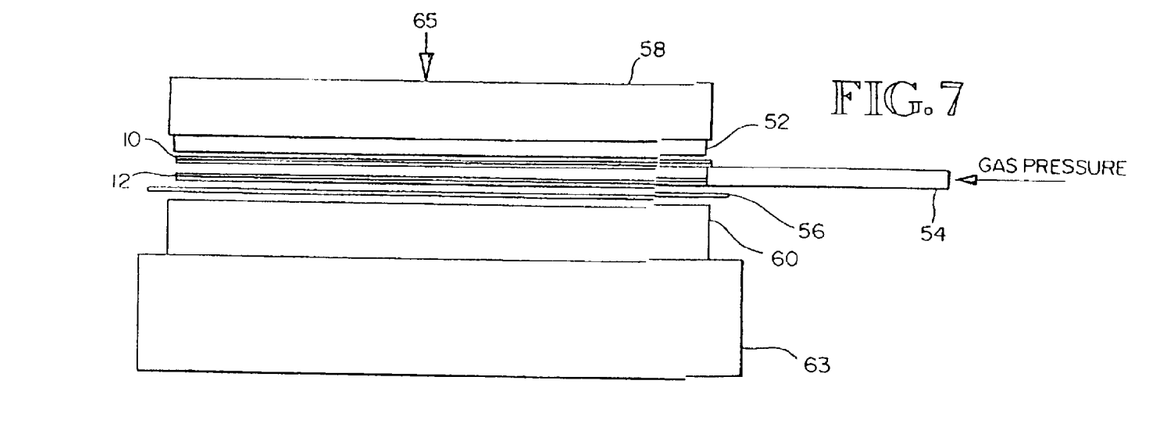
FIG. 7 is another sectional view showing another alternate stack up using an additional gasket to ensure compression.
Figure 8:
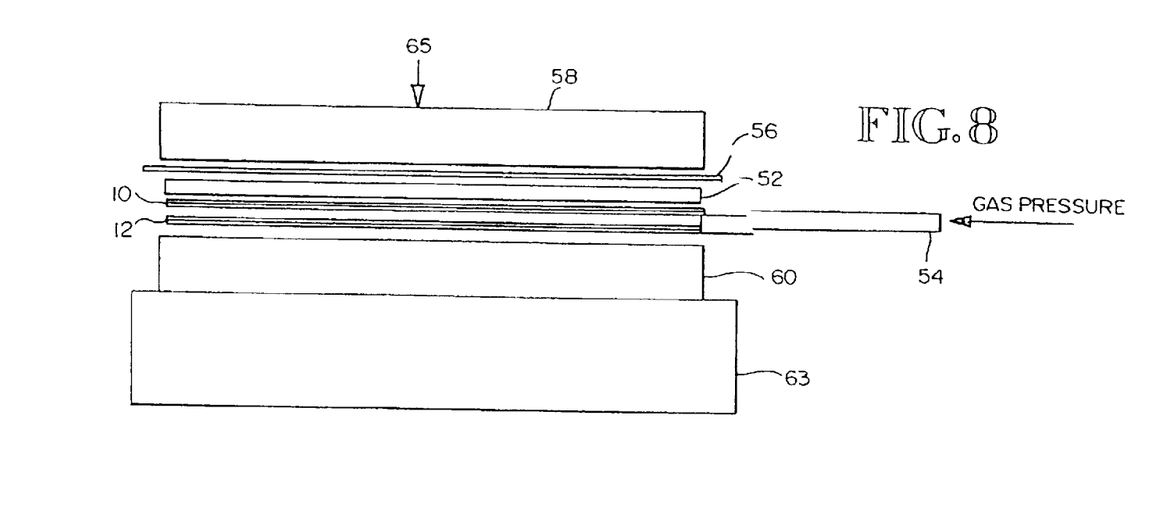
FIG. 8 is another sectional view showing an alternate stack up arrangement for the gasket.

My improvement to the compression DB method through use of a CRES template 52 is shown in various alternative embodiments in FIGS. 5–8. A CRES template 52 is located on one side (FIG. 5) or both sides (FIG. 6) of the pack. The template is a grid pattern (FIG. 9) and corresponds to the patterning made to the CRES dies in the conventional process, but with greater flexibility in die configuration and reduced costs for manufacture. Different part configurations can be made simply by changing templates rather than by changing dies. FIGS. 7 and 8 show the use of the CRES template 52 in conjunction with a titanium spacer 56. The spacer nulls deformations between the facing surfaces of the dies 58 and 60 that otherwise might lead to the disbonds McDonnell Douglas experienced. The spacer 56 softens at the forming temperature and fills any twists, bends, or valleys that might develop in the CRES dies 58 and 60. The templates also permit conversion of the diffusion bonding process to one capitalizing on efficient induction heating, thereby greatly reducing energy consuption. The diffusion bonding temperature can be easily controlled in an induction heating operation by selecting a suitable "smart" alloy with the appropriate Curie temperature in the range from 1550–1750° F. for diffusion bonding of titanium or titanium alloys. The Curie temperature, of course, would be lower for diffusion bonding other materials at lower temperatures. "Smart" susceptors and suitable alloys are described in greater detail in U.S. patent application Ser. No. 08/469,604, which I incorporate by reference.

The dies 58 and 60 are mounted on platens of the SPF press. Only the bottom platen is shown in FIGS. 5–8 for simplicity of illustration. A typical SPF press is described in the patents already discussed or in U.S. Pat. No. 5,467,626 which I incorporate by reference. The platens 63 in a conventional resistance heating press supply the necessary heat and pressure for the forming as shown schematically with arrow 65. Forming gas inlets 54 for the SPF workpiece in which diffusion bonds will be formed prior to expansion allow pressurized argon gas 67 or another suitable inert gas to inflate the cavity 42 (FIG. 4) to achieve the desired bonding and subsequent forming. I manage the gas supplied to the press using a gas management system generally of the type described in U.S. Pat. No. 5,419,170, which I incorporate by reference.

I could also use Boeing's induction heating press as described in U.S. Pat. No. 5,530,227, for example. An induction heating press uses an oscillating magnetic field to induce eddy currents in the susceptor, which in this case would primarily be the template or templates. For induction heating, the dies generally would be ceramic and would include an embedded induction coil. The templates might be faced with another susceptor sheet to envelope the part pack. Otherwise, the magnetic field would probably inductively heat the pack sheets at the same time they heated the templates. Forming after bonding might be done in a separate operation, but the overall efficiency in time and energy savings still might favor the induction heating operation.

Figure 9:
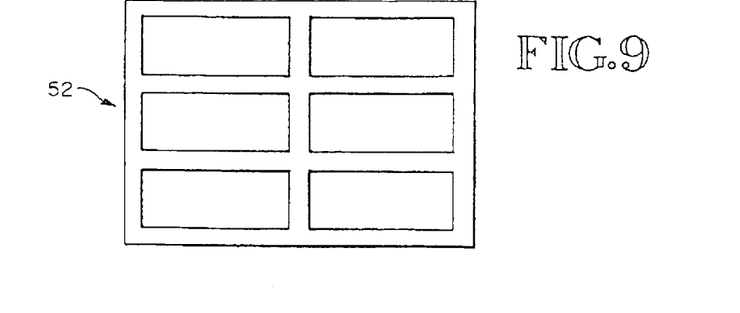
FIG. 9 is a typical plan view of a CRES template of the present invention.
Figure 10:
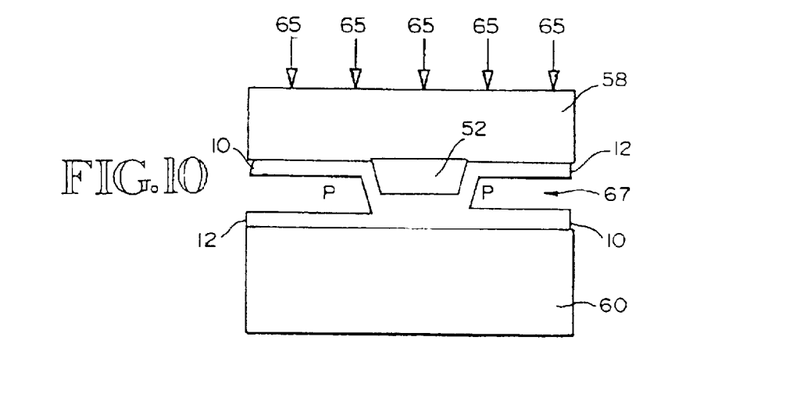
FIG. 10 is a sample section of a compression diffusion bond being formed according to the method of the present invention.
Figure 11:
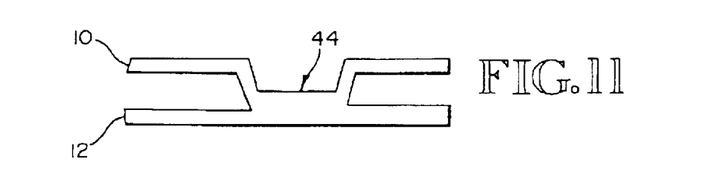
FIG. 11 is a typical part formed with the template compression diffusion bonding method shown in FIG. 10.

A typical CRES template 52 is shown in plan view in FIG. 9. The template is of window pane or gasket arrangement having narrow bands of CRES metal to define regions for the diffusion bond lines in the pack and large open areas. While shown with rectangular openings and straight sides, the template can be cut in a wide variety of patterns as appropriate for the manufactured parts. The template is easy to manufacture at relatively low cost even from CRES alloys. It generally is about 0.5–37.5 mm thick (typically 1–10 mm). It is cut with a 800–3000 W, $CO_2$ or YAG laser at any suitable draft angle or made in any other suitable way. The template 52 transfers pressure from the platens to the diffusion bond lines, and, in fact, intensifies the pressure to about 300–1200 psi by reducing the area through which the hydraulic ram force of the press acts. Using the template allows the simpler facial configurations for the press dies since the template replaces the grid pattern conventionally used.

Figure 12:
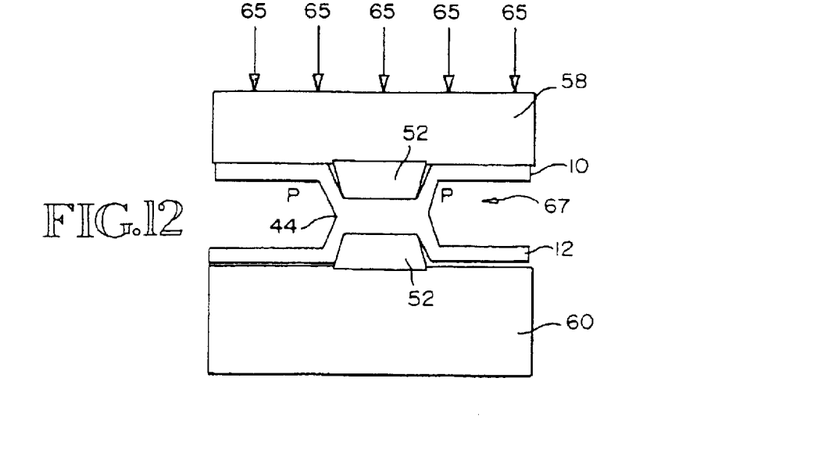
FIG. 12 is another sample section of a compression diffusion bond being formed with a two template arrangement according to an alternate method of the present invention.

If two templates are used (FIG. 6), I can create complicated forming and bonding patterns in the product. If the templates are identical in plan view (FIG. 12) so that the bands overlap in all locations, the matching bands of the templates create the 300–1200 psi pressure needed to form rapidly a diffusion bond between the sheets 10 and 12 in the area of overlap. I can reduce the diffusion bonding time from the three hours that the conventional process requires to one hour or less with resulting savings in energy consumption and labor. If, however, the bands of the templates do not register, the templates will not create pressure sufficient to form a diffusion bond. There, the bands will define expanded product configuration much like a feature milled into a die surface. The displaced bands will create unique pillowing patterns upset typically 5–15% of the titanium sheet metal thickness as the inflating pressure 67 forms the sheets.

While the dies in FIGS. 5–8, 10 and 12 are shown with flat surfaces, generally these dies will have forming cavities 75 like those shown in FIG. 4. The two-sheet pack in FIG. 4 is formed into a hat section stiffened panel.

Figure 13:
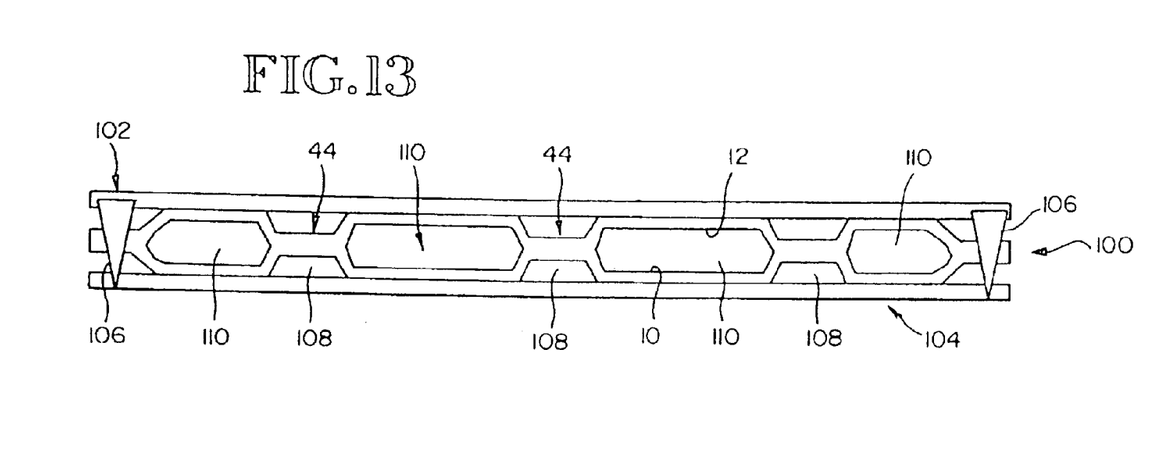
FIG. 13 is a sectional view showing a compression diffusion bonded core formed according to the method of FIG. 12 incorporated into a 4-sheet SPF/DB part.

In my preferred embodiment, I use the template 52 to make a core 100 (FIG. 13) for a multisheet product such as the core of a turbine fan blade. The core 100 is sandwiched between face sheets 102 and 104, which might be sheetstock metal matrix composites (MMC's) or a MMC-sheetstock laminate. Typical multisheet SPF parts and cores that are the subject of the present invention are described, for example, in U.S. Pat. Nos. 5,330,092 and 5,534,354, which I incorporate by reference.

Figure 14:
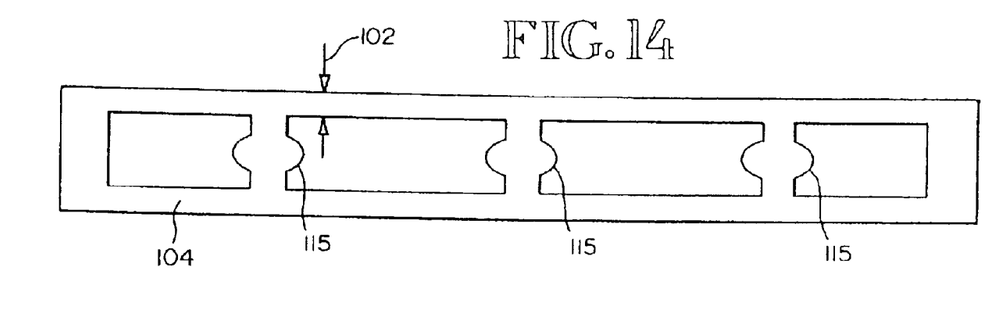
FIG. 14 is a sectional view showing a completed part using the core as shown in FIG. 13.

The core 100 from the initial diffusion bonding operation just described typically is aligned with sandwiching facing sheets 102 and 104. The new part pack is welded 106 around the periphery of the facing sheets or otherwise sealed to form a 4-sheet pack analogous to the 2-sheet pack shown in FIG. 3. This 4-sheet pack is loaded to an SPF press and is bonded, expanded, and formed to the desired final configuration shown, for example, in FIG. 14. During this second forming operation, forming gas pressure is supplied, as appropriate, to cavities 108 or 110 between the core 100 and face sheets 102 and 104 or within the core itself, respectively. The face sheets bond to the core and the internal truss walls are completed around each diffusion bond 115 that I formed in the core during the initial bonding operation. The product is a multisheet part of high quality and with disbonds.

A single sheet of material can be formed over itself, flattened to create a single bendline at the nose, and bonded in a region of intimate contact between overlapping surfaces to form a teardrop product useful as a control surface, leading edge, or rotor blade.

If I us two templates, each cut into the same grid pattern, with templates of different thickness, the formed and bonded packs have a different depth, and the formed cells (i.e. the "pillowing") will be different in shape.

If I use templates, each with a different grid pattern, such that some common surfaces are shared, the resulting part has cavities of different size, shape, draft angle and other configurations. The formed and bonded cells can be made to different shapes.

A metal sheet (generally titanium) can be used as a spacer or gasket (FIG. 7 or 8) between the template and the flat block to null any out-of-flat discontinuities or distortions between the pack and the die surfaces. In effect, the spacer is a disposable metal sheet that functions much like a gasket to correct for nonplanar tools (which is a common problem) by filling valleys in the die surfaces. Peaks are accommodated with the openings in the template. Accordingly, the template is generally thicker than the spacer.

Of course, multiple templates might be stacked on one or both sides of the part pack to obtain desired product configuration.

In operation, all tool elements are suitably coated or treated to allow disassembly of the dies, spacers, and templates. That is, suitable release agents might be used at the interfaces between these tools.

I can also use precision matched dies that are curved or even have compound contour instead of the flat dies that I have elected to show in the drawings. The dies can be metal, carbon, ceramic, or any other suitable material. The templates might include the curvature to simply manufacture of the dies. That is, while I have illustrated that the templates have planar faces, I could fabricate matching curved faces into the templates to form waves into the part pack when the pack is loaded to the press. Templates of this type, however, typically would be thicker. I might prefer to use a stack up of template elements in such case to reduce total cost.

If a metal matrix composite (MMC) material, such a silicon carbide fiber reinforced titanium, is placed in a multisheet pack for the second forming operation, the entire stack-up can be SPF/DB processed to form the core into intimate contact with the MMC and to bond facing metal sheets to the MMC to form a single MMC-reinforced, multisheet, SPF/DB panel.

The process also lends itself to the use of SPF/DB metal sheets that have been preferentially chemically milled prior to processing to attain a particular pad-up or required thickness in the finished part with localized thickening.

The template should remain strong (about 15 ksi) at the diffusion bonding temperatures for titanium in the range of about 1550–1750° F., be resistant to creep, be resistant to oxidation, and be inert with the workpiece. I prefer a metal alloy that I can readily laser cut, such as Inconel 625, Inconel 718, CRES 304, CRES 321, steel (especially nickel alloys), titanium alloys, or other high temperature, high strength materials. I could use a ceramic facing on the template as a gasket or backing between the metal of the template and the die surface.

While I have described preferred embodiments, those skilled in the art will readily recognize alternatives, variations, and modifications which might be made without departing from the inventive concept. Therefore, interpret the claims liberally with the support of the full range of equivalents known to those of ordinary skill based upon this description. The examples illustrate the invention and are not intended to limit it. Accordingly, define the invention with the claims and limit the claims only as necessary in view of the pertinent prior art.

I claim:

1. A superplastically formed, diffusion bonded structure using at least two sheet metal sheets of superplastic and diffusion bondable metal alloys, made by the method comprising the steps of:
   (a) creating an SPF/DB core by:
      (i) cleaning the sheet metal sheets at least at selected locations to activate their surfaces in those selected locations for diffusion bonding between the sheet metal sheets;
      (ii) aligning selected locations of the cleaned sheet metal sheets to provide for intimate contact between the sheet metal sheets at the selected locations for diffusion bonding;
      (iii) welding the sheet metal sheets to form a pack to make a gas-tight, perimeter seal while providing forming gas inlets into a cavity between the sheet metal sheets;
      (iv) on the exterior of the pack, positioning a template having a desired compression diffusion bonding pattern corresponding to the selected locations for diffusion bonding, the template seating in a press between opposed dies;
      (v) optionally, providing holes within the template between compression pad ups for at least one sheet metal sheet to form into, thereby establishing a part definition;
      (vi) purging the cavity of contaminants by evacuating the cavity or by introducing an inert gas to the cavity;
      (vii) heating the pack to a diffusion bonding temperature;
      (viii) pressing the sheet metal sheets together through the template to bring the sheet metal sheets into intimate contact at the locations to form diffusion bonds while applying gas pressure within the cavity to inflate the pack to prevent diffusion bonding other than at the selected locations; and
      (ix) removing the template following formation of the diffusion bonds to define bonded sheets constituting the core; and
   (b) then, sandwiching the core between the two, additional outer face sheets to define a multisheet pack; and
   (c) bonding the core to the face sheets to complete the part,
wherein at least one face sheet includes a metal matrix composite that forms an outer surface of the part.

2. A superplastically formed, diffusion bonded hat section stiffened panel using two sheet metal sheets of superplastic and diffusion bondable titanium alloy, made by the method comprising the steps of:
   (a) cleaning the two sheet metal sheets at least at selected locations to activate their surfaces in those selected locations for diffusion bonding between the sheet metal sheets;
   (b) aligning the selected locations of the cleaned sheet metal sheets to provide for intimate contact between the two sheets at the selected locations for diffusion bonding;
   (c) welding the two sheet metal sheets to form a 2-sheet pack to make a gas-tight, perimeter seal while providing forming gas inlets into at least one pack cavity between the sheet metal sheets;

(d) positioning at least one template having a desired pattern for bonding the two sheet metal sheets at the selected locations with compression diffusion bonds the template contacting the exterior of the pack and seating in a press between opposed dies;

(e) providing forming cavities within the template between compression pad ups for one sheet metal sheet to form into, thereby establishing a part definition as the 2-sheet hat section stiffened panel;

(f) purging the cavity between the sheet metal sheets of contaminants by evacuating the cavity or by introducing an inert gas to the cavity;

(g) heating the pack to a diffusion bonding temperature;

(h) pressing the sheet metal sheets together through the template to bring the sheets into intimate contact at the locations to form diffusion bonds while applying gas pressure within the pack cavity to inflate the pack to prevent diffusion bonding other than at the selected locations while forming the one sheet into the forming cavities; and (i) removing the template following formation of the diffusion bonds to define diffusion bonded sheet metal sheets constituting the 2-sheet-hat section stiffened panel.

* * * * *